United States Patent [19]
Woods

[11] Patent Number: 5,835,567
[45] Date of Patent: Nov. 10, 1998

[54] TELEPHONE LINE CIRCUIT TESTING JUMPER PLUG

[76] Inventor: Mark Woods, 1660 Lemoyne St., Echo Park, Calif. 90026

[21] Appl. No.: 593,342

[22] Filed: Jan. 29, 1996

[51] Int. Cl.$^6$ .............................. H04M 1/24; H04M 3/08; H04M 3/22
[52] U.S. Cl. .................................. 379/27; 379/5; 379/12; 379/21; 379/26; 379/438; 439/622; 439/676
[58] Field of Search ...................................... 379/1, 2, 5, 6, 379/9, 10, 12, 19, 22, 26, 27, 29, 31, 21, 438, 442, 437; 439/621, 622, 623, 626, 638, 650, 655, 668, 676

[56] References Cited

U.S. PATENT DOCUMENTS

| | | | |
|---|---|---|---|
| 4,117,264 | 9/1978 | Charles et al. | 379/9 |
| 4,288,660 | 9/1981 | Fasano | 379/27 |
| 4,661,969 | 4/1987 | Butler et al. | 379/27 |
| 4,706,271 | 11/1987 | Hilligoss et al. | 379/27 |
| 5,260,994 | 11/1993 | Suffi | 379/27 |

*Primary Examiner*—Curtis Kuntz
*Assistant Examiner*—Binh K. Tieu
*Attorney, Agent, or Firm*—Georges A. Maxwell

[57] ABSTRACT

A testing device to close a circuit between first or second sections of a pair of lines within a connector block in which the first and second sections of each line are normally connected by pairs of connector parts with which the sections of the lines are connected, a socket opening at each connector part and pairs of electrically connected contact prongs removably engaged in the socket openings, the testing device includes a manually engageable case carrying two prongs have free ends projecting therefrom and a bridge line within the case and connecting the prongs, the two prongs of the device are selectively removeably engageable in the socket openings related to the connector parts with which the first section the two parts are connected and in the socket openings related to the connector parts with which the second sections of the lines are connected.

4 Claims, 3 Drawing Sheets

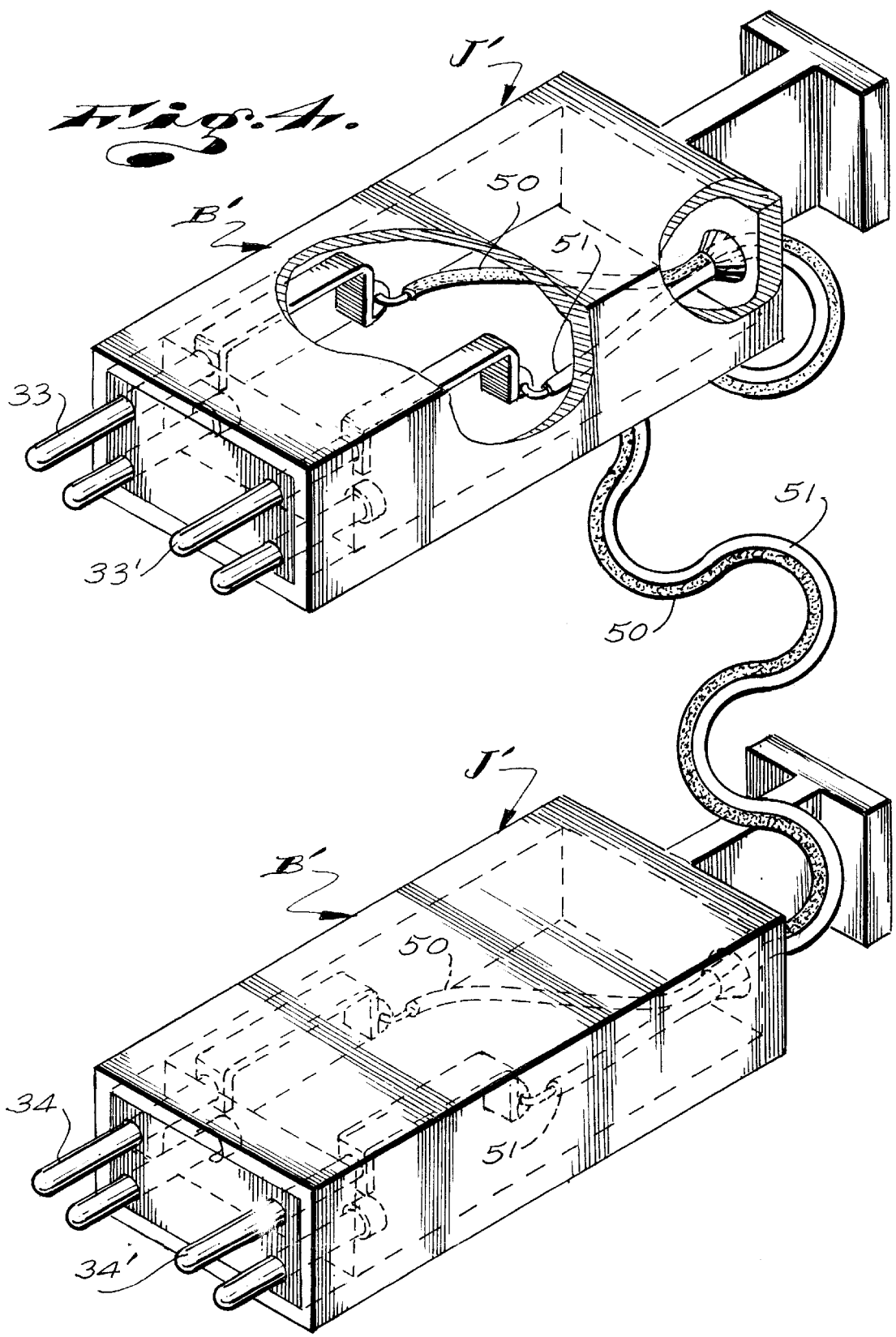

TELEPHONE LINE CIRCUIT TESTING JUMPER PLUG

BACKGROUND OF THE INVENTION

The present invention has to do with the arts of telecommunications and data processing computers and devices.

The telecommunications art is old and highly developed. The systems and equipment used in the telecommunications art have become substantially standardized throughout the world.

As regards my invention, and important feature of telecommunications systems resides in the fact that pairs of insulated wire lines are utilized to effect connecting and transmitting voice and data carrying electrical signals between signal transmitting and receiving instruments and devices.

In the United Sates, the lines of each pair of lines are most often referred to or designated as tip and ring lines. For the purpose of this disclosure, the tip lines can be viewed as output or transmitting lines that conduct signals from a related piece of equipment or device and the ring lines can be viewed as input or receiver lines that conduct signals to that piece or equipment or device.

Another important feature of telephone systems includes switching stations or mainframes that are owned, maintained and operated by telephone companies and with which multiplicities of pairs of tip and ring lines are connected. Each pair of tip and ring lines is suitably connected with the equipment of a subscriber or customer of the telephone company. The mainframe's function to connected the pairs of lines of one customer with the pairs of lines or another customer in response to a dial signal transmitted from said one customer's piece of equipment.

Another important feature that characterizes the great majority of telephone systems resides in the fact that particular care is taken to guard against electrical surges that might be introduced into the system and cause irreparable damage thereto. To this end, surge-protecting means are customarily engaged between each leg or section of each tip and of each ring line throughout a system. For example, surge-protecting means are provided at the junction of and between the tip and ring lines of a customer's equipment and the telephone company's related tip and ring lines to guard against electrical surges generated at the customer's site from entering the company's system. Further, similar surge-protecting means is provided at the connection of each tip and ring line with its related mainframe and, at all other locations where the lines might work to conduct potentially damaging electrical surges through one or more lines.

In accordance with the above, the number of surge-protecting means utilized is extremely great and the distribution of those means throughout the telecommunications art is extremely wide.

As a result of the foregoing, the surge protecting means utilized in the telecommunications art has become standardized and such a single form or kind of surge-protecting means utilizing similar, interchangeable parts are to be found throughout the world. The ordinary or standards surge-protecting means typically includes a connector block of dielectric material with a multiplicity of sets of tip and ring line connector means. Each set of connector means includes spaced-apart first and second tip line connector parts and spaced-apart first and second ring line connector parts with which first and second legs or sections of a related pair of tip and ring lines are connected.

The blocks next include first and second tip line prong-receiving socket openings related to the first and second tip line terminal parts and first and second ring line socket openings related to the first and second ring line terminal parts.

The surge protecting means next includes surge protecting coil units in the form of manually engageable plug-in units with first and second tip line prongs and first and second ring line prongs that are removeably engageable in selected first and second tip line socket openings and first and second ring like socket openings in the block. The first and second tip line prongs are electrically connected together and the first and second ring line prongs are electrically connected together so that when the prongs are entered into their related socket openings, closed circuits are established between their related sections of the tip and ring lines.

The first and second tip line prongs and the first and second ring line prongs are electrically connected within the plug in the units by suitably formed and balanced surge coil means which means are such that when an electrical surge that is in excess of a predetermined value is imposed upon them, they operate to open the circuit between their related prongs.

The above units next include a normally open grounding switch device means that automatically closes when a coil is operated to open its related circuit. The ground switch means is connected with a ground prong that enters a related ground socket opening in the connector block where it contacts a round line.

For the purpose of this disclosure, the above-described pronged units will be referred to as surge plugs. Surge plugs typically include elongate molded plastic cases with flat rear ends from which the several prongs project and front ends that are formed to facilitate the plugs being manually engaged between one's fingers for the purpose of moving the plugs into and out of working position with their related parts and/or portions of the connector blocks.

Connector blocks and surge plugs are made by numerous manufacturers and while certain details of construction and operation of the blocks and of the surge plugs produced by different manufacturers differ, the size, shape and spatial relationship of the sets of prong-receiving socket openings in the blocks and the size, shape and spatial relationship of the prongs on the surge plugs have become standardized and such that any standard surge plug can effectively engaged in and with any standard connector block.

In a standard surge plug the several prongs are approximately $3/32$" in diameter. The first tip prong and first ring prong are about $13/32$" long and the second tip prong and second ring prong are about $13/64$" wide. The pairs of tip and ring prongs are positioned near opposite sides of the front end of the case and with the first tip and ring prongs above their related second tip and ring prongs.

The socket openings in the connector blocks to receive the prongs of a surge plug are arranged and are dimensionally such that they will slideably receive and accommodate the prongs of a standard surge plug.

When the above combination and relationship of parts, a standard surge plug can only be placed into a single set of socket openings and in only one way. When plugged in, a surge plug is said to establish tip-to-tip and ring-to-ring connection between the first and second sections of a related tip line and the first and second sections of a related ring line; in a regular and predetermined manner.

In the following, the term computer refers to all of those digital data processing, transmitting and receiving machines, devices and equipment that are commonly connected with the tip and ring lines of telephone companies so that they can transmit or send data-carrying signals over those lines to other computers and receive such signals from the other computers.

Computers are now widely used in the conducting of business throughout the world. To facilitate communicating and exchanging data between those who conduct business, the owners and operators of computers rent or subscribe to use particular pairs of tip and ring lines of their local telephone companies and connect their computers with those lines with their own related tip and ring lines. With their computers thus connected with the telephone company lines, they can establish a connection between their computer and all other computers that are similarly connected with telephone company lines; for the purpose of sending and receiving data; in the same manner that telephone voice communications have long been established. The connecting of computers in telephone systems as noted above is referred to as networking and computers thus connected are referred to as networked computers.

A large and ever-increasing number of professional, industrial and commercial enterprises now rely heavily and oftentimes exclusively on networked computers in carrying on their business. As a result of the above, it is extremely important that those networked computers continue to operate to transmit and receive data at all times. A short period of "down time," when a desired connection cannot be made from one networked computer to another, can often bring about serious and costly consequences.

While a large number of networked computers are connected with and utilize a single par of tip and ring lines of the telephone company there is an ever-increasing number of networked computers that require and utilize two pairs of telephone lines.

When an owner and operator of a networked computer seeks to but is unable to establish a desired connection with another networked computer or computers, it is said that an "open" exists. That is, the closed circuit sought to be established cannot be made. And open can be the result of a parts failure in the networked computers or in the lines that connect the computers with the telephone company lines. An open can also be and often is the result of an equipment or parts failure in the telephone company's equipment.

When an open occurs, the operator of the networked computer seeking to establish a connection is the first to know that an open exists. The operator of the networked computer must take immediate steps to have the open located and corrected so that the networked computer can be put back on-line in as short a period of time as is possible.

If the operator of the networked computer relies upon and calls his telephone company for service, he must call his telephone company and request service. His request for service is processed through the telephone company service department and a next available serviceman is dispatched to the customer's place of business to commence a search for the open. It is to be expected and is not infrequent that after a customer calls for service, many hours will lapse before a serviceperson will be dispatched and arrive at a customer's site or place of business. While awaiting, the customer is often temporarily put of business.

In addition to the above, telephone service personnel are seldom familiar with the customer's networked computer set-up and are unduly slow in carrying out their servicing tasks.

Still further, telephone companies charge for service calls at customer's sites on a call-plus-time basis and the charges are often substantial.

As a result of the foregoing, it is becoming a common practice for owners and operators of networked computers to hire or contact with closely situated service companies who familiarize themselves with and regularly service the owner's computers; and, who, when called for service will be on-site within no more than 30 minutes. Those service companies are commonly designated or called "vendors" by telephone companies and are generally well received and assisted by the telephone companies since they free the telephone company's service personnel to perform other tasks.

When an open occurs and a vendor or telephone company serviceperson arrives at as customer's site, he or she first makes a cursory check of the networked computer to determine if it appears to operating properly. If the networked computer appears to be operating correctly, it is good and proper procedure to determine if the computer is delivering data-carrying signals to and is receiving such signals from the telephone company's tip and ring lines with which the tip and ring lines extending from the networked computer are connected. This check is effected at the connector block with which the distal ends of the computer's tip and ring lines are connected. In accordance with extremely old practices, this test includes stripping insulations from the distal end of the customer's tip and ring lines adjacent the terminal parts of the block with which they are connected and engaging (wrapping and/or twisting) the ends of a length of jumper wire about the stripped portions of the tip and ring lines. When the jumper wires are in place and a circuit between those lines is closed, the computer is operated to transmit a test signal through the tip line to the connector block. If that signal is returned throughout the customer's ring line and received by the computer, it is know that the open is in the telephone company's system and the telephone company is so advised. If the transmitted test signal is not receive by the computer, attention is immediately directed to repairing or replacing the computer.

Similar tests of the telephone company's sections or legs of the tip and ring lines that extend between the connector blocks are conducted.

Another notable shortcoming is testing for opens by jumping pairs of tip and ring lines in the manner set forth above resides in the fact that the lines are small and delicate lines and must be worked upon in close proximity with multiplicities of similar lines in very close quarters. As a result of the foregoing, to effect a proper jumping of a pair of lines without damaging the lines requires a great deal of skill and patience and must often be performed slowly and with particular care. The jumping of wires in the manner noted above frequently so disturbs the integrity of the lines worked upon that their ability to continue to function as intended is jeopardized.

OBJECTS AND FEATURES OF THE INVENTION

It is an object of my invention to eliminate the practice of testing for opens in pairs of tip and ring lines at connector blocks by manually working upon and engaging jumper wires about and between those lines where they connect with the connector blocks.

Another object of the invention is to provide a manually manipulable multi-pronged connector block engaging jumper plug that can be easily and conveniently engaged in a connector block in the place of a standard surge plug that is related to the pair of tip and ring lines that are to be jumped for testing purposes.

Still another object of my invention is to provide a jumper plug of the general character referred to above that can be put to its intended use without the exercise of special skills and with a minimum expenditure of time.

It is an object and feature of this invention to provide a jumper plug for the purpose set forth above that includes a manually engageable case similar to the case of a standard surge plug and that has first and second ring and tip line prongs, first and second ring line prongs projecting from the case and means within the case that connect the first tip line prong with the first ring line prong.

Another object and feature of the invention is to provide a pair of jumper plugs of the general character referred to above wherein the first tip and first ring line prongs of the two jumper plugs are connected together by an elongate flexible connector line whereby two in parallel pairs of first tip and first ring lines can be tested simultaneously.

The foregoing and other objects and features of the invention will be apparent and will be fully understood from the following detailed description of typical preferred forms and embodiments of the invention throughout which description reference is made to the accompanying drawings.

DESCRIPTION OF THE DRAWINGS

FIG. 4 is an isometric view of another embodiment of the invention.

DETAILED DESCRIPTION OF THE INVENTION

Figure 1:
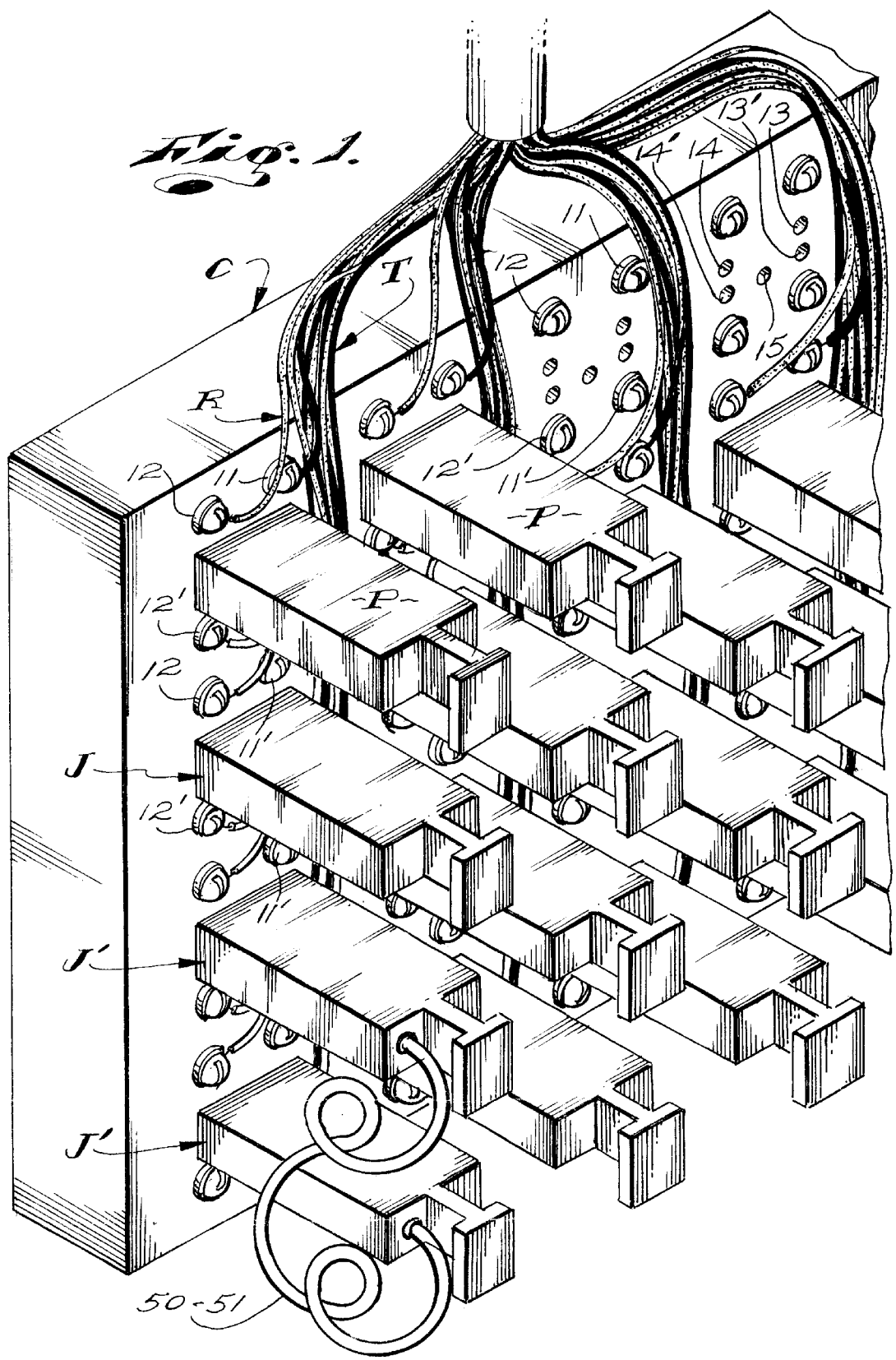
FIG. 1 is an isometric view of one form of connector block assembly.
Figure 2:
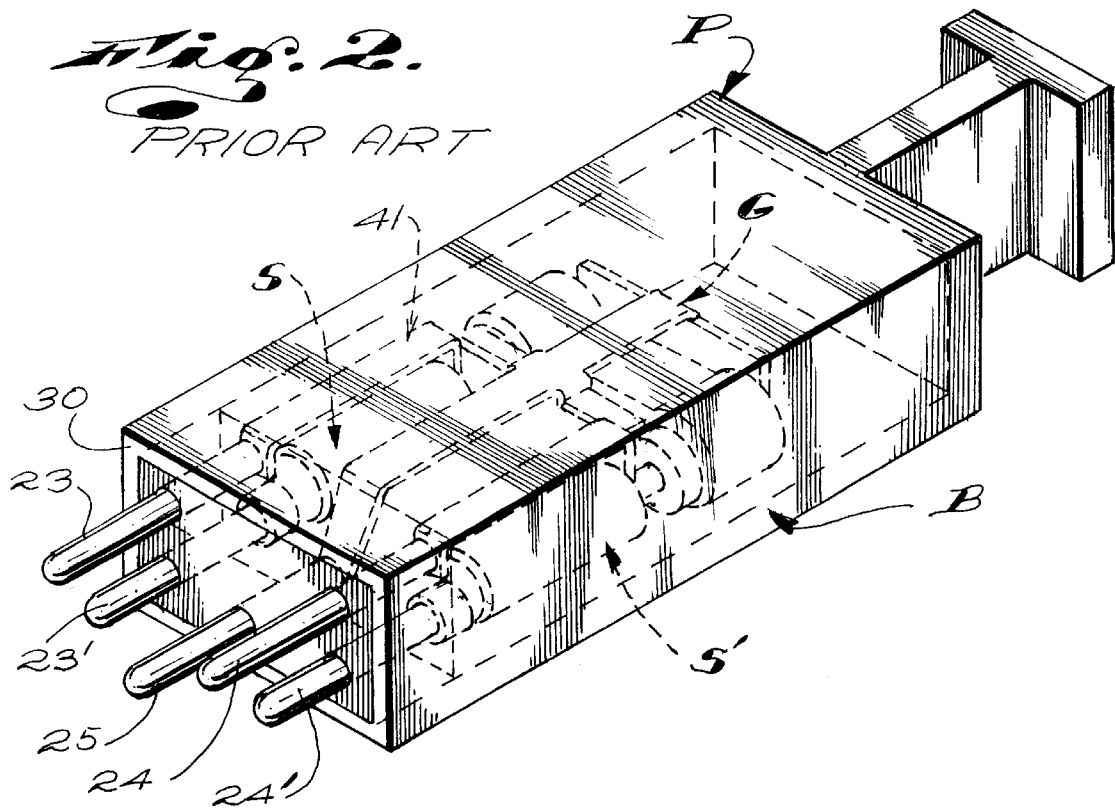
FIG. 2 is an isometric view of a standard surge plug.

In FIG. 1 of the drawings, I have illustrated one form of connector block C suitable for use in the telephone systems to connect related ends of pairs of tip and ring lines together. The block C illustrated has a front surface 10 throughout which sets of related terminal parts and socket openings are arranged to effect connection related ends of sections of pairs of tip and ring lines that lead to and from the block. The block further includes a socket opening related to each terminal part to receive connector prongs of related surge plugs P.

The tip line of each pair of tip and ring lines includes a first leg or section T connected with a first tip line terminal part 11 and a second leg or section T' (not shown) connected with a second tip line terminal part 11'. The ring line of each pair of related tip and ring lines includes a first leg or section R connected with a first ring line terminal part 12 and a second leg or section R' connected with a second ring line terminal part 12'.

The block is formed with four socket openings 13 and 13' and 14 and 14' that are adjacent to related terminal parts 11 and 11' and 12 and 12'.

As illustrated the two terminal parts 11 and 11' and the two terminal parts 12 and 12' are in vertical spaced relationship from each other and the pair of terminal parts 12 and 12' are spaced laterally (to the right of) from the pair of terminal parts 11 and 11'.

The socket openings 13 and 14 are spaced immediately below their related terminal parts 11 and 12 and the socket openings 13' and 14' are spaced immediately above their related terminal parts 11' and 12'.

Each set of socket opening next includes a ground prong receiving opening 15' that is spaced centrally between the socket opening 13' and 14'.

A surge plug P is related to each set of terminal parts and socket openings with which pairs of tip and ring lines are connected. The surge plugs include a ground prong 25, a vertically spaced first and second tip line prongs 23 and 23' and vertically spaced ring line prongs 24 and 24' that are removably entered into related socket openings 15, 13, 13', 14 and 14', respectively. The prongs 23 and 23' establish electric contact with the terminal parts 11 and 11' within the block; and the prongs 24 and 24' establish electric contact with the terminal parts 12 and 12' within the block. The prongs 23, 23', 24, 24' and 25 carried on by an elongate horizontally disposed case B having rearwardly disposed rear 30 that opposes the front surface 10 of the block C and from which rear end portions of the several above-noted sock-engaging prongs project freely.

The other or front end portion of the prongs are suitably anchored and/or set in the case. The rear ends of the prongs 23 and 23' and the rear ends of the prongs 24 and 24' are electrically connected with each other by surge-protecting coil means S and S' within the case. The coil means S and S' normally establish and maintain closed circuits between their related prongs 23 and 23' and 24 and 24'. The surge-protecting coil means S and S' operate to open or break the circuit between their related prongs when they are subjected to a surge of electric current that is great than the system of which they are a part is designed to handle.

The front end of the ground prong 25 terminates within the case and is connected with a normally open grounded switching mechanism G within the case. The switching mechanism G is operatively related to the coil means S and S' and is such that when either of the coil means S and S' is caused to open, the ground switching mechanism G closes.

In practice, standard terminal blocks and surge plugs produced at different times and by different manufacturers vary considerably in detail of design and construction, but serve the same ends and are generally compatible with other standard equipment and parts that they are used in conjunction with. That which is standard is the great majority of connector blocks is the size, spacing and arrangement of the sets of socket openings and the prongs.

Figure 3:
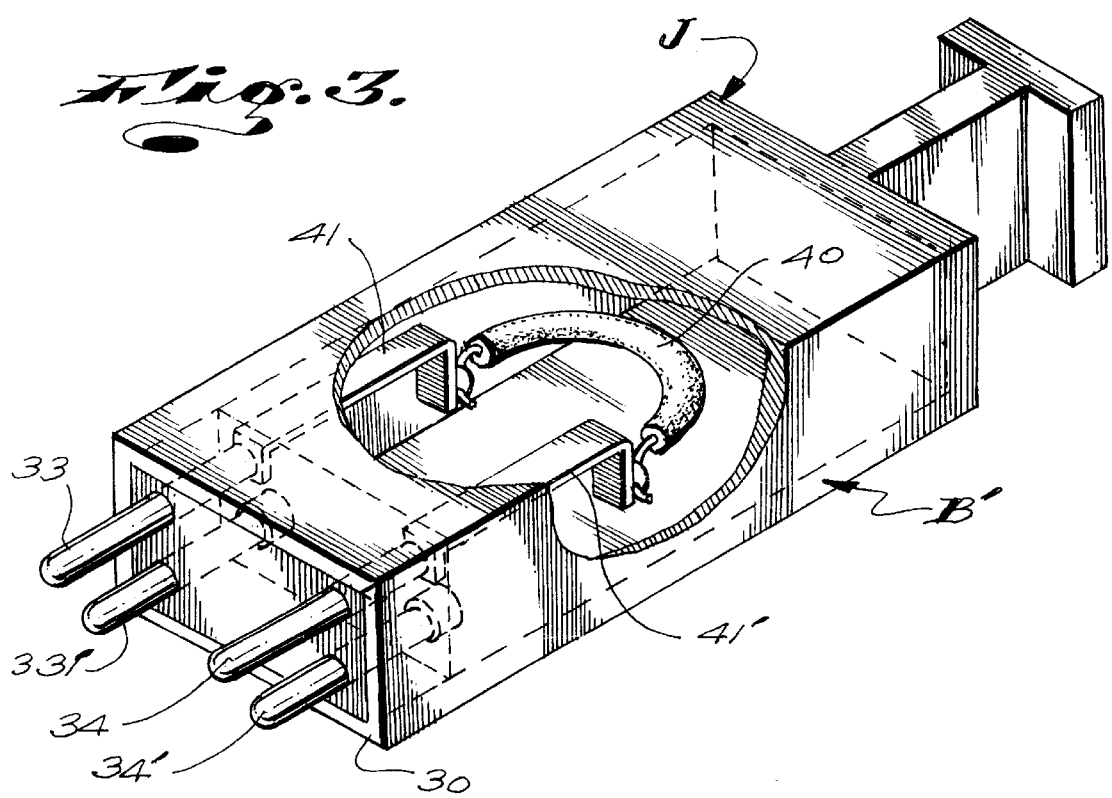
FIG. 3 is an isometric view of my new jumper plug.

In the preferred carrying out of my invention and as shown in FIGS. 1 and 3 of the drawings, my new jumper plug J is a standard surge plug structure with the surge protection coil means S and S', ground plug 25' and the ground switching mechanism G removed therefrom and within which the first tip line prong and first ring line prong are electrically connected. Accordingly, and as shown, the jumper plug J includes a case B' similar to the case B (of a surge plug) and has first and second tip line prongs 33 and 33' and first and second ring line prongs 34 and 34' carried by the rear end portion of the case B' to project freely, rearwardly therefrom.

Within the case B', the front end portion of the first tip line prong 33 is connected with the front end portion of the first ring line prong 34 by a bridge line 40 to establish a closed circuit between the prongs 33 and 34.

In practice, the coil means S and S' of standard surge protection plugs include elongate conductor parts 41 and 41' that are fixed to the rear ends of the prongs 33 and 34 and that project rearwardly within the case B. The parts 41 and 41' are established of flat metal stock and are, in effect, extensions of the prongs 33 and 34.

In the preferred carrying out of my invention, I utilize the conductor parts 41 and 41' on the prongs 33 and 34 to connect my bridge line 40 to those prongs. As shown, the bridge line 41 is a short piece of wire the opposite ends of which are connected with the conductor parts 41 and 41' on the prongs 33 and 34 as by soldering.

It is to be understood that in practice, my new jumper plug can advantageously use other forms of cases and that the means for connecting the first tip and ring line prongs together can be varied widely without in any way departing from the broader aspects and spirit of my invention.

When an open (open circuit) has been detected at a networked computer and the computer is on and appears to be operation, the operator or serviceman goes to the (energized) connector block where the first and second sections T and R of the tip and ring lines that extend from the computer are connected with the second sections T' and R' of the tip and ring lines. When at the connector block, the serviceman engages and removes the surge plug related to the subject tip and surge lines from the connector block and engages my new jumper plug in its place in the connector block. There after, a test signal is transmitted by the networked computer through the section T of the tip line. If the transmitted signal is returned to the computer by the ring line R, it is known that the open is not in the network's computer or in its related sections T and R of the tip and ring lines and is therefore in the telephone company's equipment. In such a case, the search for the open is directed to the telephone company's service personnel. On the other hand, if the open is found to exist in the networked computer or in the first and second sections T and R of the tip and ring lines that are connected with it, the search for the open is limited to the computer and sections T and R of the tip and ring lines and the need to extend the search for the open in and throughout the telephone company's equipment is eliminated.

With my new jumper plug J, the existing and present structure of the connector blocks is utilized to jump and close a circuit between related sections of a pair of tip and ring lines for easy, fast and effective testing purposes. The need to modify and/or perform time-consuming and delicate work upon anything, to effect testing of those lines is eliminated.

In furtherance of my invention and as shown in FIG. 4 of the drawings, a pair of jumper plugs J' and J" are electrically connected together by elongate, flexible, insulated coupler wires 50 and 51 to test for opens appearing at networked computers served by two pairs of telephone lines and where one pair of lines are transport or tip lines and the other pair of lines are receive or ring lines. The wire 50 is connected with and between the first tip line prongs 33 of plug J' and the first ring line prong 34 of plug J" and line 51 in connected with the between the second tip line prong 33' of the plug J' and the second ring line prong 34' of the plug J".

With the two plugs J' and J" interconnected as shown and as described, if an open is noted in a networked computer that is connected with the telephone company lines by simply removing the appropriate pair of surge plugs from the connector block and engaging my new jumper plugs J' and J" in their place. With the jumper plugs J' and J" engaged in the connector block, the computer is operated to conduct a test signal through its related tip line sections. If the signal transmitted by the computer is received by the computer, through the ring line sections connected to it, it is known that the open is in the telephone company's equipment. If the test signal is not returned to the computer, it is known that the open is not in the telephone company's equipment.

Checking and testing for opens in pairs of tip and ring lines at connector blocks by connecting jumper wires between them, at the connector blocks, often takes 20 or more minutes under the best of conditions. With my new jumper plug, the testing for opens in such lines, at the connector blocks, under the poorest conditions can be easily and conveniently performed in less than five minutes.

Of possible great significance is the fact that when working upon common telephone tip and ring lines to put a jumper wire in place and when removing the jumper wire, the wires are often parted or their integrity is otherwise so compromised that additional time-consuming work must be performed to correct the damage that has been done. With my new jumper plug, the multiplicity of sections of tip and ring lines at a connector block need not be disturbed or worked upon to effect testing for opens and the integrity of those lines should in no way be comprised.

Having described only typical preferred forms and applications of my invention, I do not wish to be limited to the specific details herein set forth but wish to reserve to myself any modifications and/or variations that might appears to those skilled in the art and that fall within the scope of the following claims.

Having described my invention, I claim:

1. In combination, a surge protector block carrying a multiplicity of pair related pairs of tip line and ring line connector parts that are connected with proximal ends of first and second sections of related tip and ring lines the digital ends of which are connected with an analog signal data emitting and receiving device, a contact prong receiving socket opening in the block related to each contact part; testing means to selectively establish a closed circuit between connector parts with which the first sections of the tip and ring lines of a selected pair of tip and ring lines are connected or between the connector parts with which the second sections of the tip and ring lines of the selected pair of tip and ring lines are connected and including a unitary manually engageable case, elongate tip line and ring line prongs carried by the case and having free end portions removably engaged in the socket openings related to the connector parts with which the first sections of the tip and ring lines of the selected pair of tip and ring lines are connected or in the socket openings related to the connector parts with which the second sections of the tip and ring lines of the selected pair of tip and ring lines are connected; and, a bridge line within the case and connected with portions of the prongs therein.

2. The combinations set forth in claim 1 wherein the tip lines include two in parallel first sections each connected with a related tip line connector part of separate pairs of tip and ring line connector parts, the ring line includes two in parallel first sections each connected with a ring line connector part of the separate pairs of ring line connector parts; the testing means includes two like cases each of which carries two tip line prongs each of which is engageable in a socket opening that is related to one of the pairs of tip line connector parts and two ring line prongs each of which is engageable in a socket opening related to one of the pairs of ring line connector parts; and, elongate flexible bridge lines extending between the two cases and connecting the tip line prongs carried by one case with the ring line prongs carried by the other case.

3. The combination set forth in claim 1 wherein each pair of tip line connector parts is related with a pair of ring line connector parts and the socket openings related to the related tip line connector parts and the ring line connector parts are in predetermined spaced relationship from each other and establishing a set of socket openings, the tip line and ring line prongs are selectively engagable in the socket openings of a set of socket openings related to the connector parts with which first sections of pairs of tip and ring lines are connected or in the socket of the set of socket openings related to the connector parts with which the second sections of tip and ring lines are connected.

4. In combination; a surge protector block having a vertical front surface, a plurality of sets of forwardly opening prong-receiving socket openings entering the front surface, each set of socket openings includes a pair of vertically spaced first and second ring line socket openings and a pair of vertically spaced tip line socket openings spaced laterally from the ring line section openings and a ground socket opening in spaced relationship between the second tip and second ring line socket openings, first and second tip line terminal parts at the first and second tip line socket openings and connected with proximal ends of elongate first and second sections of an elongate tip line, first and second ring line terminal connected with the first and second ring line socket openings and connected with first and second sections of an elongate ring; a unitary manually engageable elongate horizontal case with a rearwardly disposed rear end that is movable into and out of stopped opposing engagement with the front surface of the block to overlie a set of socket openings therein, a manually engageable rear end portion, first and second vertically spaced elongate tip line prongs carried by and projecting rearwardly from the case and engaged in related the first and second tip line socket openings and in contact with the first and second tip line contact parts therein; first and second vertically spaced elongate ring line prongs carried by the case and spaced laterally from the tip line prongs with rear end portions and projecting rearwardly from the case and engaged in related first and second ring line socket openings and in contact with the first and second ring line connector parts therein, and a bridge line in the case and connecting the tip line prong and first ring line prong together.

* * * * *